(12) United States Patent
Dai Zovi et al.

(10) Patent No.: US 9,619,802 B1
(45) Date of Patent: Apr. 11, 2017

(54) INTERCEPTION OF TOUCH PAD EVENTS FOR HANDLING IN A SECURE ENVIRONMENT

(71) Applicant: Square, Inc., San Francisco, CA (US)

(72) Inventors: Dino Dai Zovi, Brooklyn, NY (US); Eric Monti, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 14/964,430

(22) Filed: Dec. 9, 2015

(51) Int. Cl.
| | | |
|---|---|---|
| *G06F 13/00* | (2006.01) |
| *G06Q 20/40* | (2012.01) |
| *G06K 7/08* | (2006.01) |
| *G06Q 20/20* | (2012.01) |
| *G06Q 20/34* | (2012.01) |
| *G06Q 20/38* | (2012.01) |
| *H04L 29/06* | (2006.01) |
| *G06F 21/62* | (2013.01) |

(52) U.S. Cl.
CPC ..... *G06Q 20/4012* (2013.01); *G06F 21/6245* (2013.01); *G06K 7/084* (2013.01); *G06Q 20/204* (2013.01); *G06Q 20/34* (2013.01); *G06Q 20/3829* (2013.01); *G06Q 20/401* (2013.01); *H04L 63/145* (2013.01)

(58) Field of Classification Search
CPC .............................. G06F 9/4411; G06F 9/542
USPC .................................................. 719/318, 321
See application file for complete search history.

(56) References Cited

U.S. PATENT DOCUMENTS

| | | | | |
|---|---|---|---|---|
| 8,392,935 B2 * | 3/2013 | Grabowski | ........... | G06F 3/0488 345/156 |
| 2015/0287009 A1 * | 10/2015 | Crowley | ............ | G06Q 30/0236 705/16 |

FOREIGN PATENT DOCUMENTS

WO  2015/048041 A1  4/2015

OTHER PUBLICATIONS

International Search Report and Written Opinion for PCT Application No. PCT/US2016/065003, mailed Feb. 7, 2017.

* cited by examiner

*Primary Examiner* — Andy Ho
(74) *Attorney, Agent, or Firm* — Mattingly & Malur, PC

(57) ABSTRACT

Disclosed is a technique for identifying touch events performed on a mobile device within a secure environment. The technique can involve diverting coordinates for certain touch events to a secure environment in a payment application, for example, by modifying an import address table (e.g., implementing a "hook") that is accessed by an event loop of the mobile device. Generally, only those touch events that are performed within the bounds of a user interface area are diverted to the secure environment, and all touch events outside that area continue to be identified using the operating system libraries of the mobile device. A checksum may be generated for the import address table using a cryptographic hash function. The checksum allows the payment application or a payment processing system to determine whether an unauthorized modification of the import address table is present.

22 Claims, 8 Drawing Sheets

INTERCEPTION OF TOUCH PAD EVENTS FOR HANDLING IN A SECURE ENVIRONMENT

FIELD OF THE INVENTION

At least one embodiment of the present disclosure pertains to systems and techniques for securely managing payment transactions, and more particularly, to techniques for securely handling touch events performed on a point-of-sale (POS) device during a payment transaction.

BACKGROUND

Some merchants initiate payment transactions with consumers by using a mobile POS device belonging to the merchant, such as a smartphone or tablet computer (e.g., Apple iPad or the like). For example, a small, mobile card reader can be plugged into the audio jack of the mobile POS device and point-of-sale (POS) software can be executed by the mobile POS device to facilitate payment transactions completed using a payment card (e.g., credit card or debit card). The merchant swipes the consumer's payment card through the card reader, and the card reader communicates the card's data to the POS software in the mobile device. The POS software can then confirm the authenticity of the card and communicate with a remote payment authorization system to obtain authorization for the transaction.

This type of payment model, however, requires that a number of security-related issues be addressed. For example, data read from the payment card needs to be protected from discovery by unauthorized parties or entities, such as malicious software ("malware") that may exist in the mobile device. Consequently, the payment card may require the consumer input a passcode as a security measure before data is read from the card by the card reader or decrypted by the POS software. Passcodes are required, for example, in debit card-based transactions and in some credit card-based transactions, such as those associated with the Europay, MasterCard, and Visa (EMV) standard. Consequently, a problem exists, particularly (though not exclusively) for devices that participate in electronic payment transactions, of how to protect passcodes from discovery by unauthorized parties or entities.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
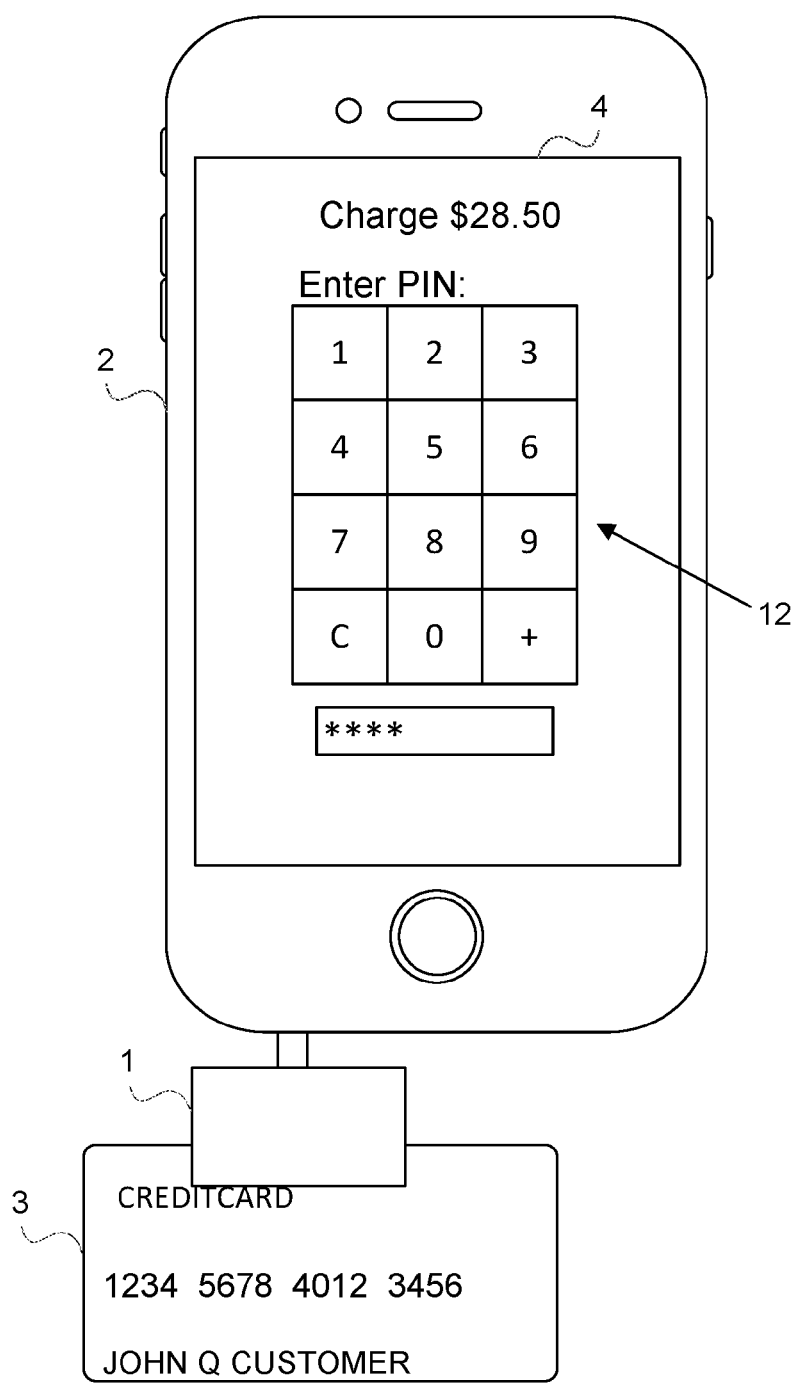
FIG. 1 illustrates an example of a configuration in which a card reader is coupled to a mobile POS device of a merchant.

In this description, references to "an embodiment," "one embodiment," or the like, mean that the particular feature, function, structure, or characteristic being described is included in at least one embodiment introduced here. Occurrences of such phrases in this specification do not necessarily all refer to the same embodiment, nor are the embodiments referred to herein necessarily mutually exclusive.

In a payment transaction involving a card reader connected to a mobile POS device, confidential or sensitive data may be communicated between the card reader and the mobile device. For example, a consumer may input a passcode (e.g., a personal identification number, or "PIN") into a user interface presented on the display of the POS device, in response to which the passcode is communicated to the card reader to allow the card reader to access other confidential or sensitive data stored on the payment card, such as the card number, expiration date, and card verification value (CVV).

Many mobile devices now include a touch-sensitive display ("touchscreen") that allows the consumer to interact with the device without needing an additional input/output device (e.g., keyboard, mouse). Each input performed using the touchscreen is called a "touch event." These touch events are conventionally handled by the operating system (OS) of the POS device. But the OS may be a target for an attacker (e.g., a malware entity) because its underlying framework supports numerous software applications and functionalities. For example, the attacker may be configured to identify a consumer's passcode by intercepting touch event data transmitted from the OS (e.g., a user input handler) to the payment application or handled within the payment application itself by OS libraries. OS libraries (e.g., graphical user interface (GUI) toolkit) are a common target for interference by intra-application (i.e., "in-app") hooking frameworks.

It is desirable, therefore, to protect the consumer's passcode and/or other private information from disclosure to unauthorized parties. Such protection can be provided, in part, by intercepting the coordinates of touch events that occur on the touchscreen of the POS device before the coordinates are received by an OS-provided library (e.g., GUI toolkit). The coordinates can then be handled in a secure environment rather than by the OS-provided libraries of the POS device. However, in some embodiments only those touch events that occur within the bounds of a user interface displayed on the touchscreen are typically intercepted. All other touch events preferably continue to be handled using the OS libraries.

Accordingly, introduced here is a technique for securely handling touch events that are required to complete a payment transaction. A trusted payment module executing in the POS application is used to intercept data (e.g., coordinates) associated with touch events performed in the POS application and identify (e.g., determine the on-screen locations of) an intended input represented by the touch events. This prevents an attacker (e.g., malware operating within the POS application) from intercepting data passing from the OS to the touch event processor, that might otherwise occur. The touch event processor can be configured to identify alphanumeric characters and other inputs (e.g., delete character, confirm input) that are necessary to complete the payment transaction. The touch event processor may be software, such as a part of the payment application, as assumed in this description to facilitate explanation. Note, however, that the touch event processor could alternatively be dedicated hardware, such as an integrated circuit (IC) chip or chipset in the POS device or a combination of software and dedicated hardware.

Upon receiving coordinates for a touch event, an application is traditionally configured to transmit the coordinates to OS libraries (e.g., GUI toolkit, UI kit) for handling. More specifically, the operating system normally transmits the coordinates to the foreground application's event loop, which relays the coordinates to a GUI toolkit for processing. Here, however, the event loop of the POS application is configured to divert the coordinates of selected touch events to a secure input handler. Rather than place a function call to the OS libraries as would typically occur, the event loop instead places a function call to the secure application code. This can be accomplished by modifying the import address table accessed by the display driver. More specifically, a function "hook" can be implemented in the import address table. "Hooking," as referred to herein, covers a range of techniques used to alter the behavior of software (e.g., a touchscreen display driver) by intercepting a function call that is passed between software components. The modified code that handles the intercepted function call is called a "hook." Other interposition techniques could also be used, such as direct manipulation of shared data structures or placing identified touch events directly into the application event queue. If the coordinates indicate that the touch event occurred within the bounds of a displayed user interface of the payment application, or some specified portion (e.g., input field(s)) of that user interface, the touch event is diverted to a secure UI element for handling.

In some embodiments, the user interface is only displayed on a portion of the touchscreen. The user interface may, for instance, only be used for those touch events that convey sensitive (e.g., personal, financial) information. Oftentimes, a touch event is one of a series of touch events that convey a multi-character passcode. By mimicking the functionality of the user input handler, the trusted module within the payment application is able to determine the intended input (e.g., character or command) represented by each touch event from the received coordinates.

In some embodiments, the payment application is communicatively coupled to a payment processing system operated by a payment processing entity. The payment processing system can be configured to facilitate processing of the payment transaction between the merchant and a consumer. For example, the payment processing system may maintain one or more accounts for the consumer, where each account is associated with a different payment card (e.g., credit card, debit card). Further yet, the payment processing entity may not be the issuer of some or all of the payment cards involved in the transactions it facilitates; for example, the payment processing entity may be a business entity, which is not necessarily a payment card issuer, dedicated to facilitating card based payment transactions.

The secure input handler (or some other part of the payment application) may also be configured to generate a checksum of at least a portion of the modified import address table maintained by the OS. For instance, the portion may include only those function address references that are used in combination with sensitive information or are considered most vulnerable to an attack (e.g., by malware). The checksum can be generated using any cryptographic hash function, such as an MD5 message-digest algorithm. In some embodiments, the secure input handler is also configured to identify and remap those function address references in the import address table that have been randomly arranged by address space layout randomization (ASLR), a security technique employed to protect against buffer overflow attacks. The checksum, which allows the payment application and/or payment processing system to determine whether the import address table includes an unauthorized modification (e.g., a "hook"), is generally more reliable in highly homogeneous runtime environments, such as Apple iOS. Homogeneous runtime environments are those environments that share many of the same fundamental runtime characteristics.

FIG. 1 illustrates an example of a configuration in which a card reader 1 is coupled to a mobile POS device 2 belonging to a merchant. Together, the card reader 1 and POS device 2 are able to facilitate completion of payment transactions that involve payment cards (e.g., credit cards, debit cards). While the illustrated POS device 2 is a smartphone, it could instead be a tablet, personal computer, etc. The card reader 1 can plug into a standard connector of the POS device 2, such as an audio jack or micro-USB port. Alternatively, the card reader 1 may connect to the POS device 2 wirelessly (e.g., via a Bluetooth connection). A payment card 3 can then be read by swiping the card 3 through the card reader 1. The term "swipe" as used herein refers to any manner of triggering the card reader 1 to read data from the payment card 3, such as by passing a card into or through a magnetic stripe card reader, optical scanner, smartcard (i.e., card with an embedded IC chip) reader, radio frequency identification (RFID) reader, or the like.

Figure 2:
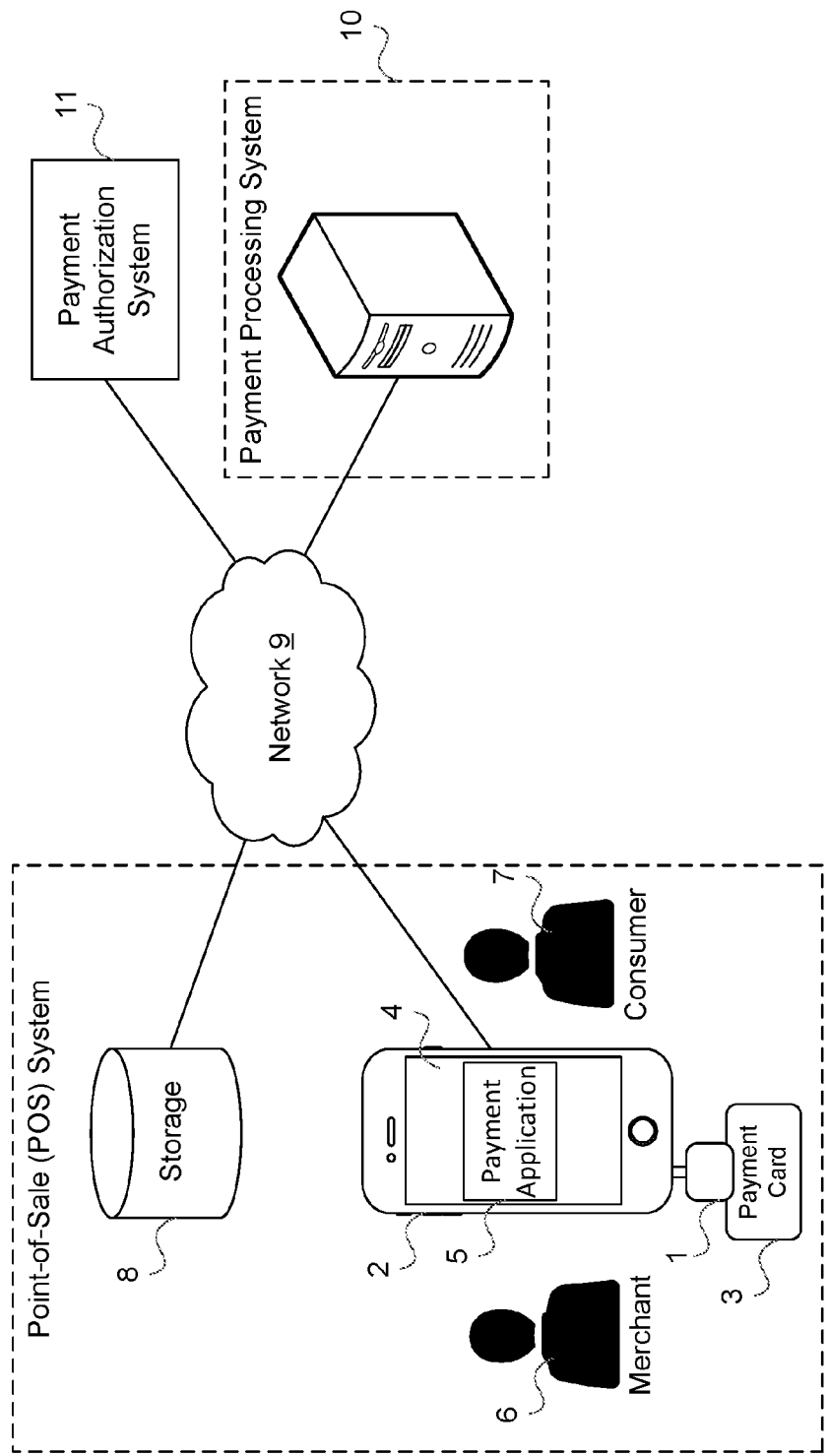
FIG. 2 depicts a network environment in which the POS device can operate.

FIG. 2, meanwhile, depicts a network environment in which the POS device 2 can operate. When a payment transaction is to be completed, the merchant 6 initiates the payment application 5 on the POS device 2. In response, the payment application 5 is executed by the POS device 2 and causes the touch-sensitive display 4 to present a user interface 12 that allows the merchant 6 and/or consumer 7 to complete the transaction. The touch-sensitive display 4 can be, for example, a resistive or capacitive touchscreen.

Figure 3A:
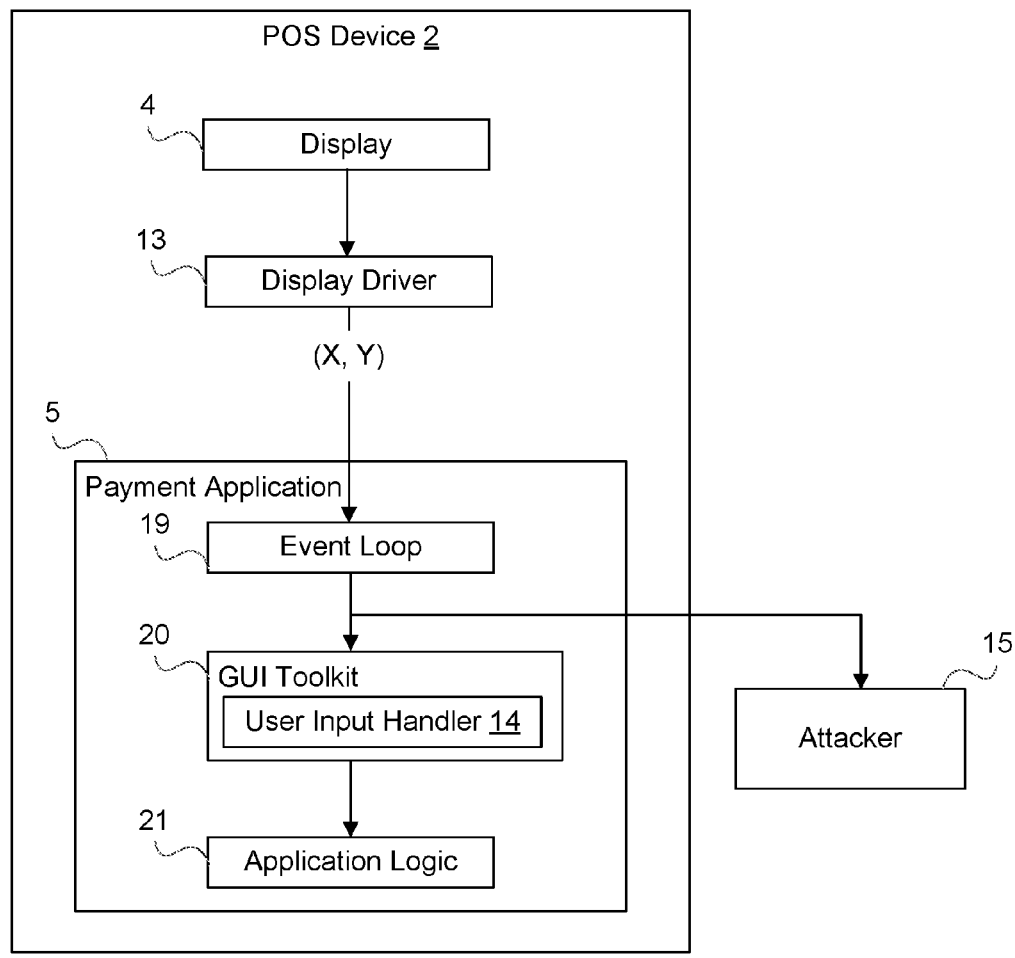
FIGS. 3A and 3B illustrate how touch events are conventionally handled by the POS device and how the technique introduced here diverts touch events into a secure environment, respectively.
Figure 3B:
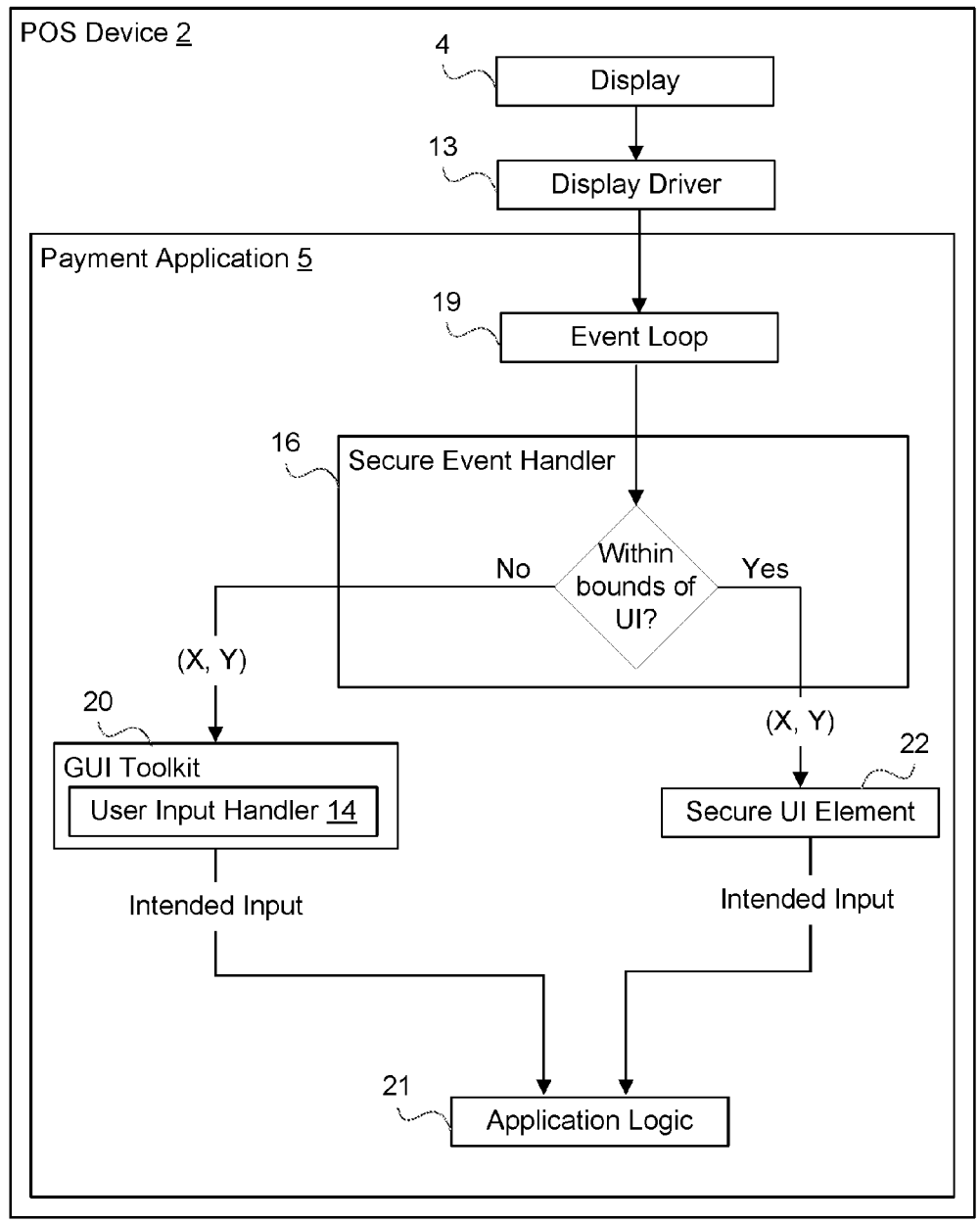

Many payment transactions require the consumer 7 enter a passcode before the payment application 5, card reader 1, or POS device 2 perform an action (e.g., read data from the card 3). For example, a PIN may be provided to the card reader 1, which could compare it against PIN data read from the card 3. A payment processing system 10 may be in the transaction path between the POS device 2 and the payment authorization system 11. The consumer 7 may do so by typing the passcode directly on the touch-sensitive display 4 of the POS device 2 using a user interface 12 generated by the payment application 5, as shown in FIGS. 1 and 3A-B. The user interface 12 can be, for example, an alphanumeric touchpad that is presented on a portion of the touch-sensitive display 4. In some embodiments, the user interface 12 includes other buttons (e.g., enter, delete/backspace) in addition to alphanumeric keys. As described above, each input performed using the touch-sensitive display 4 is known as a "touch event."

Coordinates for each touch event are initially received by the main event loop of the POS application. The coordinates are then processed using a secure UI element of the payment application 5 or the OS libraries based on whether the touch event is performed using the user interface 12. Consequently, those touch events related to inputting a passcode are handled within a secure environment by the payment application, which identifies the intended input based on the received coordinates.

Once interpreted, the payment application 5 is able to use the passcode to perform various actions. For example, the payment application 5 may communicate the passcode to the card reader 1, which uses the passcode to "unlock" the consumer's card 3 in order to read or decrypt data from the card 3. Once the card data has been read from the card 3, it is passed by the card reader 1 to the payment application 5, which is able to forward the card data along with other information about the payment transaction (e.g., transaction amount, date and time, merchant identification) to a remote payment authorization system 11 to request authorization of the payment. Details of the payment authorization system 11 are not germane to the technique being introduced here. Note, however, that the payment authorization system 11 may include multiple business entities and multiple computers and/or other devices. For example, the payment authorization system 11 may include one or more banks and/or other financial institutions, including a payment card issuer, an acquirer, a credit card network (e.g., Visa or MasterCard), etc.

As indicated above, it is desirable to protect the confidentiality of the consumer's passcode from the OS of the POS device 2. Therefore, the technique introduced here enables interception of certain touch events for processing by the payment application 5. In some embodiments, interception is caused by modifying code within the import address table initialized by the OS. For example, the import address table may be modified by at application startup time by the secure module. Alternatively, the payment application 5 could be configured to modify the import address table. The modified code or "hook" prevents certain touch events from being processed and identified by the GUI toolkit. Identification of these diverted touch events can instead be performed by the payment application 5 or the card reader 1. In some embodiments, the POS device 2 is communicatively coupled to a storage 8 (e.g., a cloud-based storage that offers remote access) that forms part of the point-of-sale (POS) system.

The payment application 5 is communicatively coupled to a payment processing system 10, which is or includes one or more server computers coupled via a network 9 to the POS device 2. The network 9 can be a combination of two or more networks, which may be different types of networks. For example, the illustrated network 9 could include a wireless portion and a wired portion. The wireless portion can be or include, for example, a cellular telecommunications network, a WiFi/IEEE 802.11 compatible network, a Bluetooth connection, or the like, or a combination of such networks/connections. The wired portion can be or include, for example, the Internet, a Metropolitan Area Network (MAN), a corporate Wide Area Network (WAN), a wired local area network (LAN), or the like, or a combination of such networks.

FIG. 3A illustrates how touch events are conventionally handled by the OS libraries of the POS device 2, while FIG. 3B illustrates how touch events are handled in the technique introduced here. As shown in FIG. 3A, a display driver 13 receives coordinates for each touch event performed on the touch-sensitive display 4 and then passes the coordinates to an event loop 19 that is supported by the OS libraries. The event loop 19 receives various events for the payment application 5 (e.g., touch events, keyboard events, application switching, quitting) and relays the coordinates to a user input handler 14 of a GUI toolkit 20 for handling. The GUI toolkit 20 examines the raw coordinates for the touch events, decodes the coordinates, and translates each set of coordinates into an action on the payment application's defined UI (e.g., a tap on the display 4 turns into a function call to a button's defined "on click" handler). Said another way, the GUI toolkit 20 is able to identify the input (e.g., character, command) intended to be conveyed by the touch event and relay that information to the application logic 21 of the payment application 5. The event loop 19 and GUI toolkit 20 are typically part of the OS libraries of the POS device 2. However, an attacker 15, such as malware executing in the payment application 5, may attempt to intercept these coordinates by diverting the information to an environment controlled by the attacker 15.

As shown in FIG. 3B, the technique introduced here diverts the coordinates associated with certain touch events into a secure environment (e.g., a secure UI element 22 of the payment application 5) by bypassing the GUI toolkit 20 and unprotected application logic 21, which prevents attackers from intercepting confidential or sensitive information. This can be done by modifying portion(s) of the main executable (e.g., the import address table) of the payment application 5 that are accessed by the event loop 19. The modified code can divert the delivery of touch events to a secure event handler 16, which determines whether the touch events should be handled by the secure UI element 22 or the GUI toolkit's user input handler 14. The secure event handler 16, meanwhile, is designed and created such that some or all of the functionalities provided by the user input handler 14 are also provided by the secure event handler 16.

Generally, only those touch events performed within the bounds of the user interface 12 are diverted to the secure UI element 22. All other touch events continue to be handled by the GUI toolkit's user input handler 14. This prevents sensitive information associated with touch events (e,g., user passcodes) from being intercepted by attackers who target the OS libraries of the POS device 2.

Figure 4:
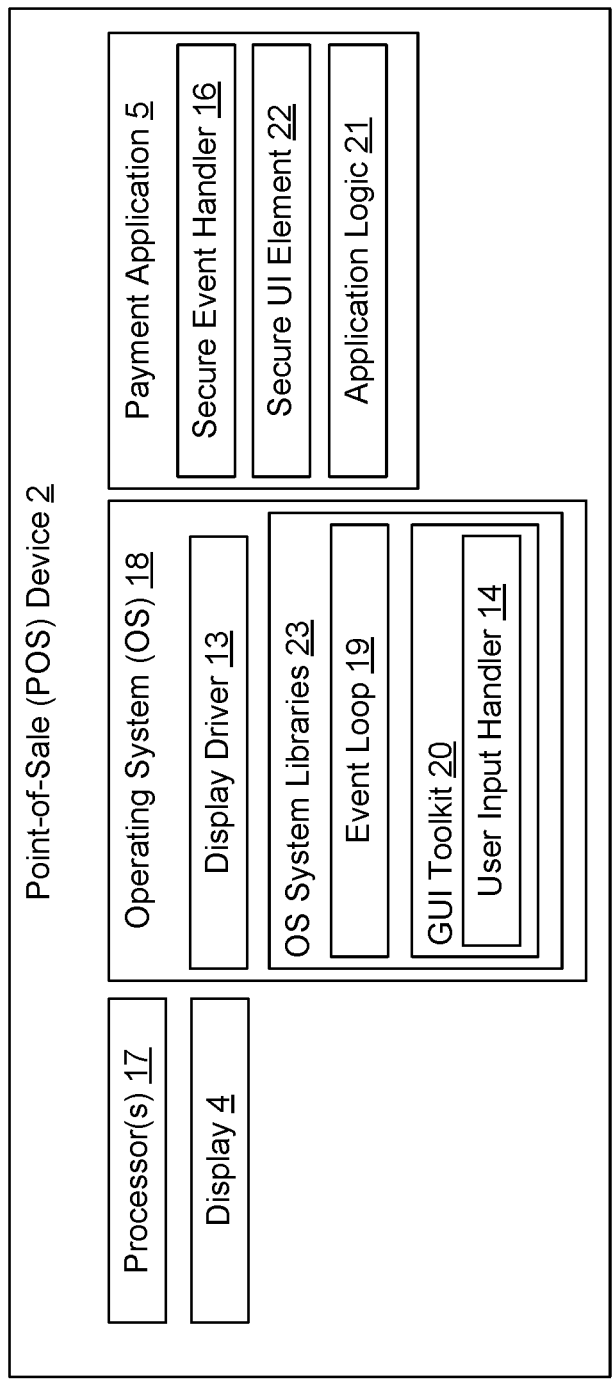
FIG. 4 illustrates one example embodiment of the POS device.

FIG. 4 illustrates one example embodiment of the POS device 2. Note that certain components that are not germane to this description may not be shown. The POS device 2 depicted here includes one or more processors 17, a display 4, a main OS 18, and a payment application 5. The display 4 can be, for example, a touch-sensitive display or a traditional non-touch display (in which case the POS device 2 likely also includes a separate keyboard or other input device and the touch events are "click events"). The main OS 18 includes a display driver 13 that receives coordinates indicative of touch events and a series of libraries 23 (e.g., event loop 19, GUI toolkit 20) that can be called by the payment application and used to identify the intended input for each touch event from the coordinates.

In accordance with the technique introduced here, the POS device 2 includes a secure input handler 16 that communicates with the display driver 13 via the event loop 19 and the payment application 5. The secure input handler 16 may also communicate with other components of the main OS 18, such as the user input handler 14. The secure input handler 16 can be software, hardware, or a combination thereof. As illustrated by FIG. 4, the secure input handler 16 can operate as an integral part of the payment application 5. However, the secure input handler 16 could also be logically separate from the payment application 5. In some embodiments, the secure input handler 16, payment application 5, or both are hosted and/or executed at least partly by a card reader 1 coupled to the POS device 2.

The secure input handler 16 intercepts certain touch events and prevents those touch events from being handled by the user input handler 14 of the payment application 5 (e.g., by implementing modified code (a "hook") in the import address table that causes the event loop 19 to send events to the a secure input handler 16 instead of the user input handler 14). That is, the secure input handler 16 receives the coordinates for touch events that would typically be handled by the user input handler 14. Generally, only some subset of touch events, such as those performed in sensitive input windows or fields, are diverted by the secure event handler 16 for handling by the secure UI element 22. Because these coordinates are never received by the user input hander 14, these touch events (and the information they convey) remain invisible to an attacker who has hacked the OS 18 of the POS device 2.

The secure UI element 22 identifies the intended input for each set of coordinates diverted by the secure event handler 16 and relays the intended input to the application logic 21 of the payment application 5. Once received by the payment application 5, the intended input can be used to complete a payment transaction.

Figure 5:
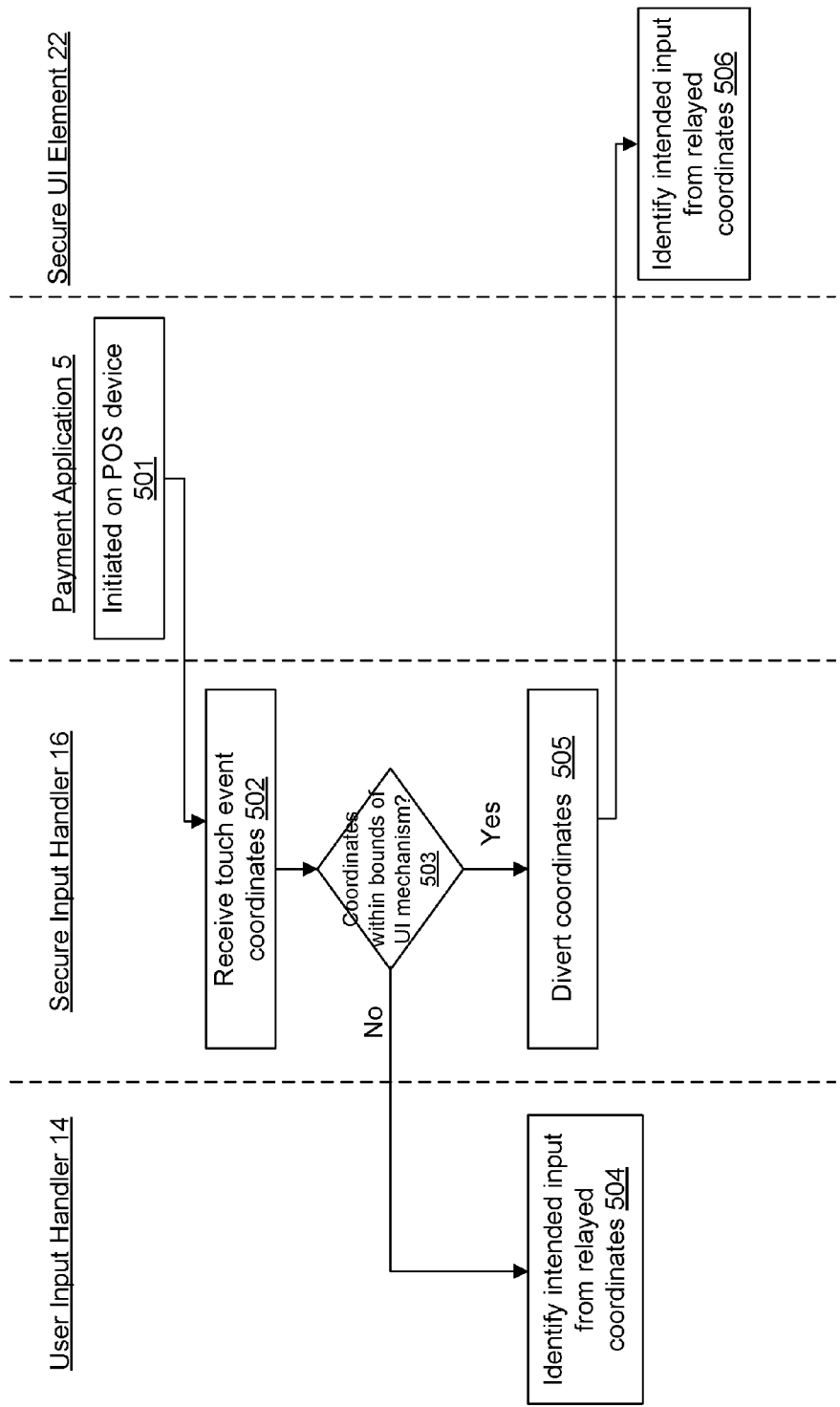
FIG. 5 shows a process in which certain touch event coordinates are diverted to a secure environment of a payment application for handling.

FIG. 5 shows a process by which certain touch event coordinates are diverted to the secure UI element 22 rather than the user input handler 14 of the GUI toolkit 20. The payment application 5 is first initiated by the POS device 2 in order to facilitate completion of a payment transaction between a merchant and a consumer (step 501). The device driver 13 receives coordinates for each touch event performed on the touch-sensitive display 4 of the POS device 2 and passes the coordinates to the event loop of the foreground application 19, which relays the coordinates to a secure input handler 16 (step 502). As noted above, this can be accomplished modifying the import address table accessed by the device driver 13. Other interposition techniques could also be used. For example, the secure input handler 16 may cause direct manipulation of shared data structures or, after identifying the intended input, the secure UI element 22 could place the intended input directly within the application event queue of the OS. The secure input handler 16 is able to determine whether the coordinates are within the bounds of the user interface 12 (or a specified subset of the user interface, e.g., one or more specified windows or fields) (step 503).

If the coordinates are not within the bounds of the user interface 12, the coordinates are transmitted to the user input handler 14 of the GUI toolkit 20 as would normally occur (step 504). However, if the received coordinates are within the bounds of the user interface 12 (e.g., an alphanumeric touchpad) presented on the touch-sensitive display 4, the coordinates are diverted to the secure UI element 22 for processing (step 505). The payment application 5 can then identify (e.g., via the secure UI element 22) the intended input from the coordinates (step 506). Thus, the secure input handler 16 and secure UI element 22 are able to largely, if not entirely, mimic the functionality of the user input handler 14 and the GUI toolkit 20 within a secure environment controlled by the payment application 5 (and, in turn, the payment processing system 10) rather than the POS device 2. Once the intended input is identified by the secure UI element 22, it can be used by the payment application 5 to complete the payment transaction.

Figure 6:
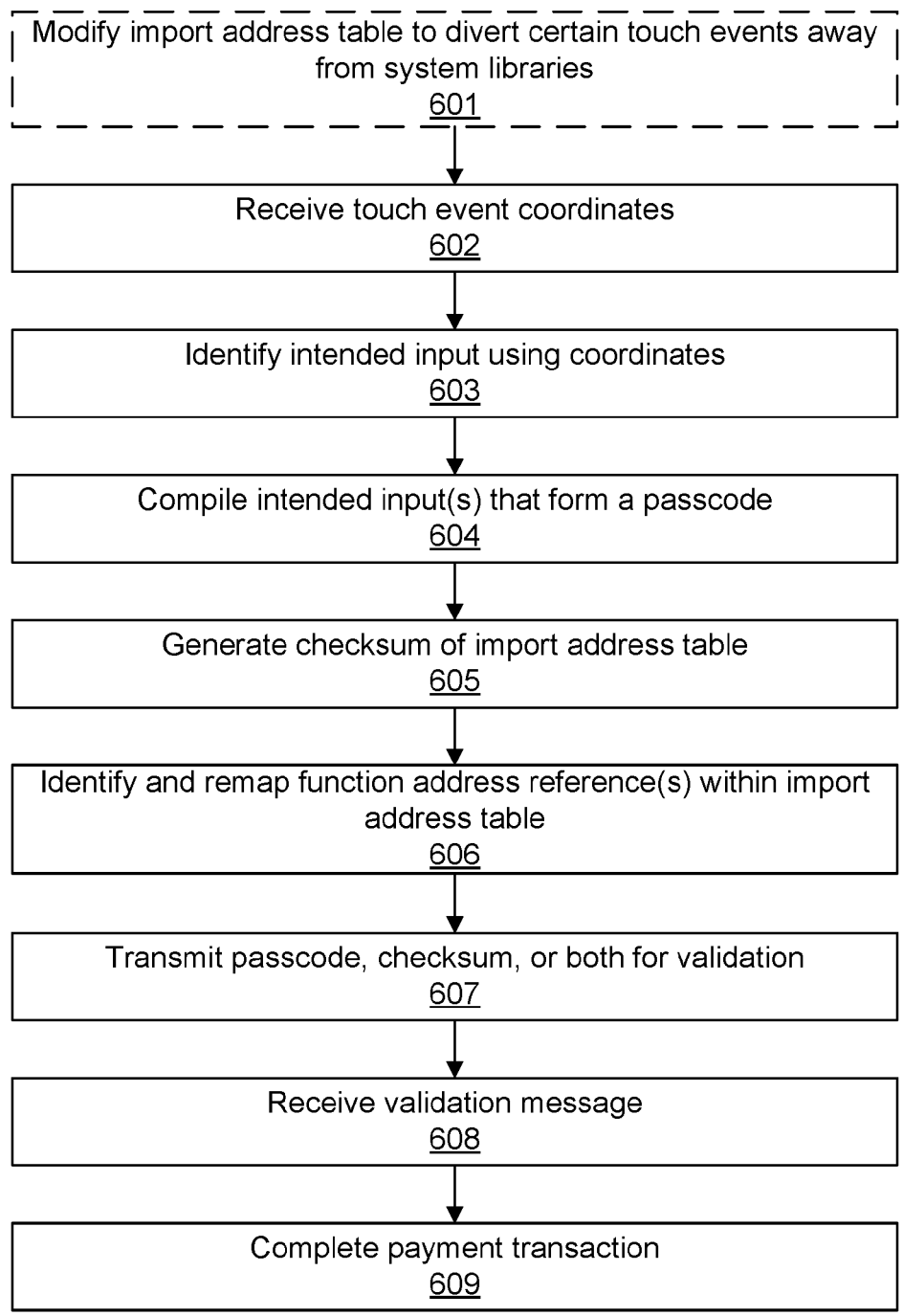
FIG. 6 depicts a process in which the payment application facilitates completion of a payment transaction.

FIG. 6 depicts a process in which the payment application 5 facilitates completion of a payment transaction. As described above, the main executable (e.g., by an application implementing modified code) is first modified to prevent certain touch events from being handled by the libraries of the main OS 18 (step 601). The secure input handler 16 of the payment application 5 subsequently receives a set of coordinates from the display driver 13 of the POS device 2 (e.g., by diverting coordinates received by the event loop 19) that corresponds to one of these touch events (step 602). The secure UI element 22 of the payment application 5 uses the coordinates to identify an intended input, such as a character or command, and then uses the intended input to complete the payment transaction (step 603). The payment application 5 may compile two or more intended inputs together to form a multi-character passcode (step 604), which may be necessary to complete a debit card-based or some credit card-based payment transactions. Particular modules of the payment application 5 could also be configured to perform these actions. For example, the secure UI element 22 may be used to receive the coordinates and identify the intended input, while a response module may be configured to identify an appropriate action (e.g., seek authorization, generate a prompt) based on the intended input.

In some embodiments, as in the illustrated process, the payment application 5 generates a checksum of the import address table, which can subsequently be checked (by the payment application 5 or another entity) to determine whether an attacker has attempted to implement an unauthorized modification of the import address table (step 605). The checksum can be generated and checked periodically or on-demand (e.g., upon receiving a command from the payment processing system 10). The checksum can be generated by traversing and processing all of the imported functions for a given executable file at runtime after the dynamic loader has performed dynamic linking between libraries. The dynamic loader is part of the OS 18 that loads and links the libraries needed by the given executable file when executed by copying library content from persistent storage to random access memory (RAM) and relocating function address references. Once the loader is done with the linking, a normal runtime includes function addresses mapped to specific imported libraries. A modified runtime, however, will have a different signature since the one or more altered function address(es) used as inputs will deviate from what is expected.

The checksum can be generated across all loaded programs or some subset of loaded programs, including the main executable of the payment application 5. There may be instances where only specific files or programs (e.g., those that handle sensitive financial information) are included in the checksum. However, the checksum is preferably applied across the entire runtime environment. In some embodiments, a checksum is generated for each specific build of the payment application 5 running on a given POS device. Moreover, a back-end system, such as the payment processing system 10, may be able to gather the checksum values from numerous POS devices that are known to indicate an attacker has tampered with the runtime environment. This back-end system can be trained (e.g., using various machine learning techniques) to identify anomalous checksum values with little or no manual intervention.

The payment application 5 is generally able to determine more consistently and reliably whether an unauthorized modification of the runtime environment is present based on the checksum when the main OS 18 is highly homogeneous. The checksum can be generated by using any cryptographic hash function, such as an MD5 message-digest algorithm, although circumstances may dictate a particular hash function is necessary or desirable. To generate reliable checksum values, the payment application 5 in the illustrated process flow also identifies and remaps one or more function address references within the import address table that have been randomly arranged by ASLR (step 606). ASLR randomly arranges the address space positions of key areas of a process to prevent an attacker from reliably jumping to, for example, an exploited function in memory. Therefore, the address space positions must be remapped to their original locations for the checksum value to accurately identify modification(s) to the import address table.

The payment application 5 also transits the passcode, the checksum, or both to one or more external systems for validation (step 607). For example, the passcode may be transmitted to a payment authorization system 11 (e.g., credit card issuer), while the checksum may be transmitted to the payment processing system 10. Once validation is received (step 608), the payment application 5 can perform the whatever tasks are necessary to complete the payment transaction (step 609).

Figure 7:
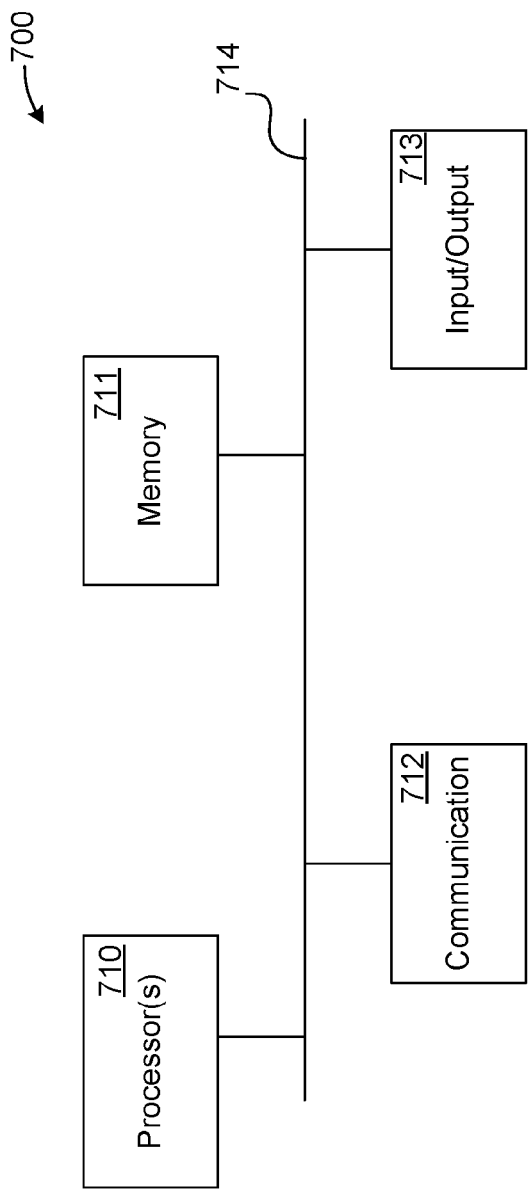
FIG. 7 is a high-level block diagram of a hardware architecture of a processing system that can be used to facilitate payment transactions, such as a POS device.

FIG. 7 illustrates at a high-level an example of the hardware architecture of a processing system that can be used to implement the payment processing system 10, card reader 1, or the mobile device 2 (although the implementation would be different for each case). Note that the payment processing system 10 can comprise multiple instances of the architecture shown in FIG. 7 (i.e., multiple computers), which may be coupled to each other via a network or multiple networks. Furthermore, the computer system that implements the payment processing system 10 may perform functions other than facilitating payment transactions.

In the illustrated embodiment, the architecture 700 includes one or more processors 710, memory 711, one or more communication devices 712, and one or more input/output (I/O) devices 713, all coupled to each other through an interconnect 714. The interconnect 714 may be or include one or more conductive traces, buses, point-to-point connections, controllers, adapters and/or other conventional connection devices. The processor(s) 710 may be or include, for example, one or more general-purpose programmable microprocessors, microcontrollers, application specific integrated circuits (ASICs), programmable gate arrays, or the like, or a combination of such devices. The processor(s) 710 control the overall operation of the processing device 700.

Memory 711 may be or include one or more physical storage devices, which may be in the form of RAM, read-only memory (ROM) (which may be erasable and programmable), flash memory, miniature hard disk drive, or other suitable type of storage device, or a combination of such devices. Memory 711 may store data and instructions that configure the processor(s) 710 to execute operations in accordance with the techniques described above. The communication devices 712 may be or include, for example, an Ethernet adapter, cable modem, Wi-Fi adapter, cellular transceiver, Bluetooth or BLE transceiver, or the like, or a combination thereof. Depending on the specific nature and purpose of the processing device 700, the I/O devices 713 can include devices such as a display (which may be a touch screen display), audio speaker, keyboard, mouse or other pointing device, microphone, camera, etc.

In the case of the POS device 2, the communication devices 712 can be or include, for example, a cellular telecommunications transceiver (e.g., 3G or 4G/LTE), Wi-Fi transceiver, Bluetooth or BLE transceiver, or the like, or a combination thereof. In the case of the payment processing system 10, the communication devices 712 can be or include, for example, any of the aforementioned types of communication devices, a wired Ethernet adapter, cable modem, DSL modem, or the like, or a combination of such devices. Additionally, the POS device 2 includes a card interface or connector (not shown) that connects to the card reader 1 as described above. The connector can be, for example, a standard audio jack, micro-USB connector, or any other known or convenient type of connector. The card reader 1 is a mechanism for reading data from a payment card and may be, for example, a magnetic stripe reader, smartcard IC chip reader, optical code reader, radio frequency identification (RFID) tag reader, or other similar device.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system for maintaining security for payment transactions between a merchant and consumers, the system comprising:

a merchant point-of-sale (POS) device that executes a payment application associated with a payment processing entity and includes an operating system, the operating system including a driver module and a user input handler, the payment application including a secure input handler configured to prevent interception of a user-input passcode by a malware entity configured to intercept data passing from the driver module to the user input handler executing within the payment application, the passcode being required to execute a payment transaction between a particular consumer and the merchant, the secure input handler configured to prevent said interception by performing a plurality of operations for a touch event performed by the particular consumer that indicates at least part of a particular passcode associated with the particular consumer, the plurality of operations including:

receiving, by the secure input handler, a set of coordinates associated with the touch event from the driver module of a touchscreen of the merchant POS device, the touch event performed by the particular consumer on a touch-sensitive user interface mechanism displayed in a portion of a total area of the touchscreen based on data generated by the payment application, the portion being less than an entirety of the total area of the touchscreen, wherein the touch event represents a character of the particular passcode required to execute a particular payment transaction between the particular consumer and the merchant;

causing, by the secure input handler, a function call indicative of the touch event to be made to a secure user interface (UI) element of the payment application rather than to the user input handler in response to the touch event, while touch events outside said portion of the total area of the touchscreen result in function calls being made from the secure input handler to the user input handler of the operating system of the merchant POS device; and identifying, by the secure UI element, a character represented by the touch event based on the set of coordinates.

2. The system of claim 1, said operations further including:

generating a checksum of at least a portion of an import address table maintained by the operating system of the merchant POS device; and identifying and remapping function address references within the import address table that have been randomly arranged by address space layout randomization (ASLR).

3. The system of claim 2, wherein the portion of the import address table includes at least one function address reference that is capable of being altered by the malware entity.

4. The system of claim 1, wherein a payment processing system is operated by the payment processing entity that facilitates processing of the payment transactions between the merchant and the consumers, wherein each of the consumers uses at least one of a plurality of payment card accounts for a respective transaction with the merchant, each of the plurality of payment card accounts being associated with one of a plurality of payment cards, and wherein the payment processing entity is not an issuer of at least one of the plurality of payment cards.

5. A method comprising:

in response to a touch event on a touchscreen of a point-of-sale (POS) device, causing a function call that is indicative of the touch event and that includes a set of coordinates associated with the touch event to be made to a secure user interface (UI) element of an application executing in the POS device while preventing the function call from being made to a user input handler of an operating system of the POS device;

receiving, by the secure UI element of the application, the set of coordinates associated with the touch event from a driver module of the touchscreen; and identifying, by the secure UI element of the application, an intended input represented by the touch event based on the set of coordinates included in the function call made to the application.

6. The method of claim 5, wherein the function call comprises modified software code and has been substituted for a function call to the operating system.

7. The method of claim 5, wherein the touch event conveys at least part of a passcode required to execute a payment transaction between a consumer and a merchant on the POS device.

8. The method of claim 5, wherein the intended input is a character or a command.

9. The method of claim 7, wherein the touch event is performed by the consumer on a user interface displayed on the touchscreen of the POS device.

10. The method of claim 9, wherein the user interface is presented on a portion of the touchscreen.

11. The method of claim 10, wherein touch events outside the portion of the touchscreen displaying the user interface result in a function call being made to the user input handler of the operating system of the POS device.

12. The method of claim 5, wherein the application is executed, at least in part, by a card reader coupled to the POS device.

13. The method of claim 5, further comprising:

communicating, by the application, with a remote payment processing system operated by a payment processing entity that facilitates processing and validating of payment transactions initiated by a merchant on the POS device.

14. The method of claim 5, wherein the function call is directed to the secure UI element of the application rather than to the user input handler of the operating system of the POS device by executing a modified function referenced in an import address table that is accessed by an event loop.

15. The method of claim 14, wherein causing the function call indicative of the touch event to be made to the secure UI element of the application prevents interception of data indicative of the touch event by a malware entity configured to intercept the data indicative of the touch event passed between operating system libraries accessed by the application.

16. The method of claim 9, wherein the user interface comprises an alphanumeric keypad.

17. A point-of-sale (POS) device comprising:

a processor;

a network interface coupled to the processor that allows the POS device to communicate with a payment processing system over a network; and a memory storing a payment application that, when executed by the processor, causes the POS device to perform operations that include receiving, by a secure input handler of the payment application executing in the POS device, a set of coordinates associated with a touch event from a driver module of a touchscreen of the POS device, wherein the touch event is performed on a user interface presented on the touchscreen;

in response to the touch event, directing a function call indicative of the touch event to a secure user interface (UI) element of the payment application and not to a user input handler associated with an operating system of the POS device; and identifying, by the secure UI element of the payment application, an intended input represented by the touch event based on the set of coordinates, the set of coordinates directed to the payment application by the function call.

18. The POS device of claim 17, wherein the touch event conveys at least part of a passcode required to execute a payment transaction between a consumer and a merchant on the POS device.

19. The POS device of claim 18, wherein said operations further comprise:

upon receiving an indication the consumer is finished entering the passcode, transmitting the passcode from the POS device to the payment processing system, a payment authorization system, or both for validation.

20. The POS device of claim 19, wherein the payment authorization system is operated by a payment card issuer.

21. The POS device of claim 17, wherein the function call is directed to the secure UI element of the payment application rather than to the user input handler associated with the operating system of the POS device by executing a modified function reference in an import address table maintained by the operating system of the POS device.

22. The POS device of claim 21, wherein said operations further comprise:

generating a checksum of the import address table maintained by the operating system of the POS device; and identifying and remapping a function address reference within the import address table that has been randomly arranged by address space layout randomization (ASLR).

* * * * *